United States Patent [19]

Takizawa et al.

[11] Patent Number: 5,077,713
[45] Date of Patent: Dec. 31, 1991

[54] MAGNETO-OPTICAL DISK WRITING/READING APPARATUS INCLUDING A FLOATING MAGNETIC HEAD

[75] Inventors: Teruyuki Takizawa, Neyagawa; Masanari Mohri; Tohru Nakamura, both of Katano City, all of Japan

[73] Assignee: Matsushita Electric Industrial Co., Ltd., Kadoma, Japan

[21] Appl. No.: 528,842

[22] Filed: Dec. 11, 1990

[30] Foreign Application Priority Data

Dec. 13, 1989 [JP] Japan .................................. 1-324791

[51] Int. Cl.$^5$ ....................... G11B 11/12; G11B 13/04
[52] U.S. Cl. ......................................... 369/13; 360/114
[58] Field of Search ....................... 369/13; 360/59, 66, 360/114; 365/122

[56] References Cited

U.S. PATENT DOCUMENTS

| | | | |
|---|---|---|---|
| 4,701,895 | 10/1987 | VanSant | 360/59 |
| 4,706,232 | 11/1987 | Funada et al. | 369/13 |
| 4,789,972 | 12/1988 | Oldham | 369/13 |
| 4,853,811 | 8/1989 | Brooks, Jr. et al. | 360/103 |
| 4,937,801 | 6/1990 | Miura et al. | 360/114 |
| 5,020,041 | 5/1991 | Nakao et al. | 369/13 |

FOREIGN PATENT DOCUMENTS 57-133503  8/1982  Japan .................................. 369/13

Primary Examiner—Stuart S. Levy
Assistant Examiner—Hoa Nguyen
Attorney, Agent, or Firm—Cushman, Darby & Cushman

[57] ABSTRACT

In an opto-magnetic disk type writing/reading apparatus having a magnetic head held by a suspension load beam in an air-borne floating state over a surface of the opto-magnetic disk, the suspension load beam is raised up or put down in a manner that firstly the opto-magnetic disk is revolved at a higher revolution speed than the predetermined rated revolution speed for a predetermined short period, and thereafter the revolution speed is lowered to the predetermined revolution speed after soft-landing putting down of the magnetic head to achieve a steady-state air-borne floating position.

3 Claims, 3 Drawing Sheets

MAGNETO-OPTICAL DISK WRITING/READING APPARATUS INCLUDING A FLOATING MAGNETIC HEAD

FIELD OF THE INVENTION AND RELATED ART STATEMENT

1. Field of the Invention

The present invention relates to a disk writing/reading apparatus.

2. Description of the Related Art

Recently, opto-magnetic disks are attracting much attention as high density and large capacity memory devices and become for use more and more as information memory disks for information writing/reading apparatuses. And in opto-magnetic disk apparatus, magnet-modulation type apparatus with overwriting function using a small type magnetic head of floating type is under research.

Opto-magnetic disk information writing/reading apparatus of the prior art comprises a spindle motor 2 for driving an opto-magnetic disk, an optical head with produces laser beam spot on a track on the opto-magnetic disk to record, erase or write information on the opto-magnetic disk and a magnetic head which is disposed on the other side of the opto-magnetic disk with a very small gap to the surface of the opto-magnetic disk. The magnetic head is generally made very light and held by an air-bearing type suspension so as to achieve the very narrow gap. In such prior are apparatus, the magnetic head is supported by an elastic suspension member and the elastic suspension member is driven to raise and put down the magnetic head from and to the surface of the opto-magnetic disk. And the raise and put down of the magnetic head is controlled by a micro-computer which also controls rotation of the spindle motor.

In such conventional apparatus, the magnetic head is put down to the surface of the opto-magnetic disk when the opto-magnetic disk is rotated by the spindle motor and reaches a predetermined rotation speed. Then, the magnetic head is held by air-bearing over the surface of the opto-magnetic disk by means of an air-flow at the surface induced by the high speed rotation of the opto-magnetic disk. And after the putting down of the magnetic head on the surface of the opto-magnetic disk with a predetermined very small gap made by the air-bearing, the writing erasing or reading operations are carried out.

However, the above-mentioned prior art apparatus has the following problems. The air-bearing flying force of the magnetic head corresponds to the given rotation number of the opto-magnetic disk. Accordingly, when the magnetic head is put down onto the opto-magnetic disk, in case the speed of the rotation of the opto-magnetic disk is below the predetermined speed, there is a possibility that the magnetic head collides to the surface of the opto-magnetic disk depending on excess of the speed of putting down. Such collision will make a grave damage on both the surface of the opto-magnetic disk and the magnetic head.

OBJECT AND SUMMARY OF THE INVENTION

The propose of the invention is to improve the disk writing/reading apparatus so as to be free from the above-mentioned collision of the magnetic head onto the surface of the opto-magnetic disk when the magnetic head is putting down.

The disk writing/reading apparatus in accordance with the present invention comprises:

revolving means for revolving an opto-magnetic disk, an optical head for forming at least one light spot on a track on the opto-magnetic disk for writing, reading or erasing signals on the opto-magnetic disk, a magnetic head provided opposing the optical head with the opto-magnetic disk therebetween and held by a suspension means for making the magnetic head afloat on a surface of the opto-magnetic disk with a given narrow gap therebetween by taking advantage of airborne floating on the surface induced by revolution at a predetermined revolution speed of the opto-magnetic disk, the magnetic head generating magnetic fluxes at writing or erasing, raise/put-down means for raise up or put down the suspension means with respect to the surface, control means for controlling revolution of the revolving means in a manner that firstly the opto-magnetic disk is revolved at a revolution speed higher than the predetermined rated revolution speed for a predetermined period, and thereafter the revolution speed is lowered to the predetermined revolution speed after putting down of the magnetic head to a steady-state air-borne floating position.

Furthermore, the disk writing/reading apparatus in accordance with the present invention may comprise:

revolving means for revolving an opto-magnetic disk, an optical head for forming at least one light spot on a track on the opto-magnetic disk for writing, reading or erasing signals on the opto-magnetic disk, a magnetic head provided opposing the optical head with the opto-magnetic disk therebetween and held by a suspension means for making the magnetic head afloat on a surface of the opto-magnetic disk with a given narrow gap therebetween by taking advantage of airborne floating on the surface induced by revolution at a predetermined revolution speed of the opto-magnetic disk, the magnetic head generating magnetic fluxes at writing or erasing, raise/put-down means for raising up or putting down the suspension means with respect to the surface, magnetic head-position detecting means for detecting up-down motions and positions the magnetic head through position of the raise/fall means, and control means for controlling revolution of the revolving means in a manner that firstly the opto-magnetic disk is revolved at a revolution speed higher than the predetermined revolution speed for a predetermined period, and thereafter the revolution speed is lowered to the predetermined rated revolution speed only after reception of a detection signal from the head-position detection means informing that the magnetic head is put down to a steady-state air-flow position by putting down of the raise/falling means.

According to the above-mentioned configuration, the revolution speed of the opto-magnetic disk is higher than the predetermined rated revolution number at the first stage before reaching to a steady-state air-flowing of the magnetic head. Therefore, the magnetic head firstly certainly is air-borne with larger air gap than the steady-state thereafter. By such preliminarily disposition of higher revolution speed than the predetermined rated revolution speed of the opto-magnetic disk, the magnetic head can safely reach the steady-state air-borne floating position from the higher and safer position over than opto-magnetic disk. Therefore, there is no fear of undesirable colliding of the magnetic head onto the surface of the revolving opto-magnetic disk.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
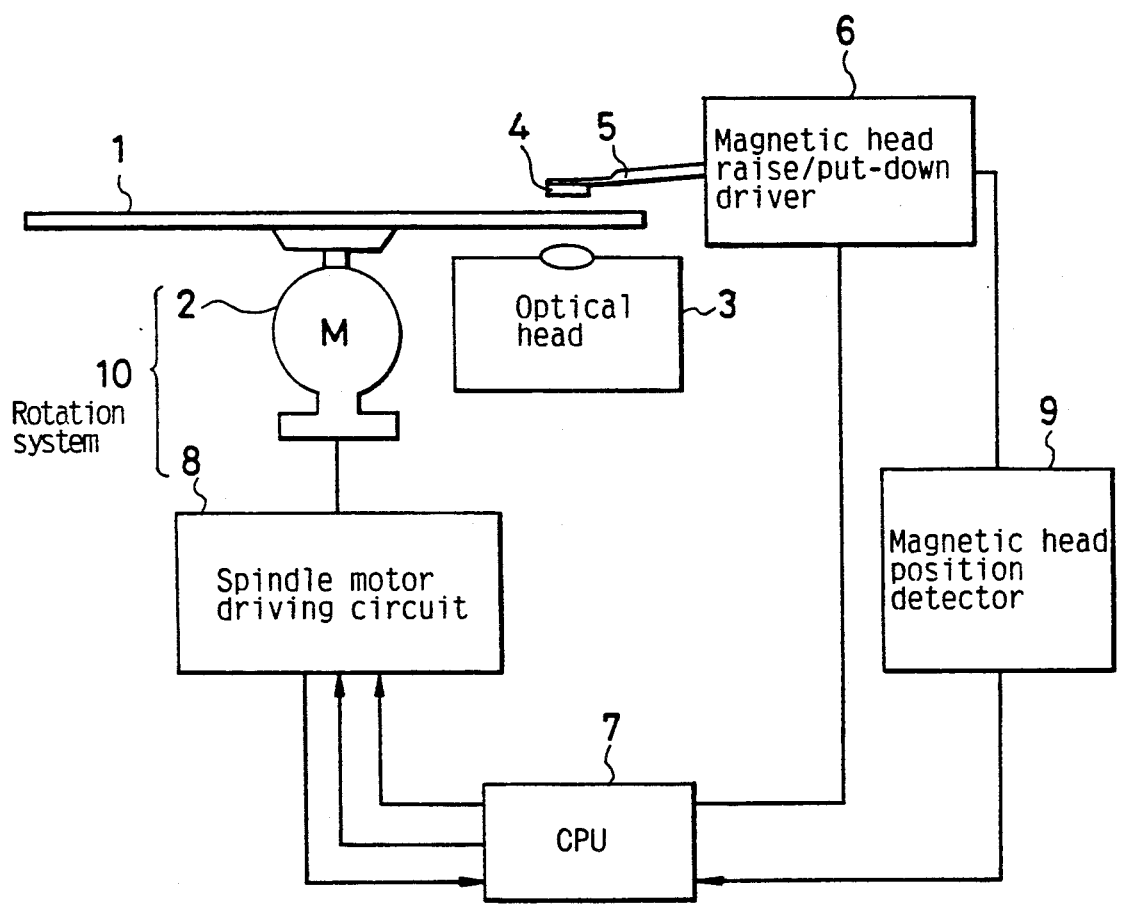
FIG. 1 is a circuit block diagram of a first embodiment of the disk writing/reading apparatus embodying the present invention.

FIG. 1 is a circuit block diagram of a preferred embodiment of the present invention.

As shown in FIG. 1, an opto-magnetic disk 1 has concentric tracks or a spiral track thereon and is rotatably held by a spindle motor 2.

The spindle motor 2 is controlled by the spindle motor driving circuit 8. A known optical head 3 is provided under the opto-magnetic disk 1 in a manner to project a light spot on a track of the surface of the opto-magnetic disk 1. An opto-magnetic recording film which is for example, made of a composition containing terbium, iron, and cobalt is formed on a polycarbonate disk-shaped substrate of a thickness of 1.2 mm, by evaporation-deposition to a thickness of about 400 Å, to make the opto-magnetic disk 1. The opto-magnetic film is covered with an oxide film, and further with an overcoat including acrylic monomer and oligomer as its main component for the purpose of protection and lubrication. On this evaporation-deposited film, the magnetic recording is processed by a magnetic head raising the temperature thereof by focusing a laser light to a spot of diameter of about 1 μm from rear side responding to data to be recorded. A magnetic head 4 is provided opposing the optical head 3 with the opto-magnetic disk 1 therebetween. The magnetic head 4 is held by a suspension member 5 which is raised up or put down by a magnetic head raise/put-down driver 6. The magnetic head raise/put-down driver 6 is controlled by an output of a micro-processor 7, in a manner that to put down the suspension member 5 only after reaching by the spindle motor 2 to the revolution number to rotate the opto-magnetic disk 1 at a predetermined revolution speed, and raise the suspension member 5 when the electrification to the spindle motor 2 is ceased by the spindle motor driving circuit 8. The position of the suspension member 5 which is driven by the magnetic head raise/put-down driver 6 is detected by a magnetic head position detector 9, and the detection signal therefrom is given to the micro-processor 7.

The micro-processor 7 controls the revolution of said spindle motor 2 in a manner that, at the initial stage of electrification of the spindle motor 2, the opto-magnetic disk is revolved at a revolution speed Ra which is higher than a predetermined rated revolution speed Rb, for a predetermined short period (such as 3 seconds); and that thereafter the revolution speed is lowered to the predetermined rated revolution speed. The lowering of the revolution speed is controlled by receiving the detection signal from the magnetic head position detector 9 which informs that the magnetic head is put down by putting down of the suspension member 5. That is, the spindle motor driving circuit 8 switches revolution speed of the spindle motor 2 in a manner to revolve the spindle motor 2 at a higher speed Ra and at a lower rated speed Rb, by receiving control signal from the micro-processor 7. The spindle motor 2 and the spindle motor driving circuit 8 together constitute a rotation system 10.

Figure 2:
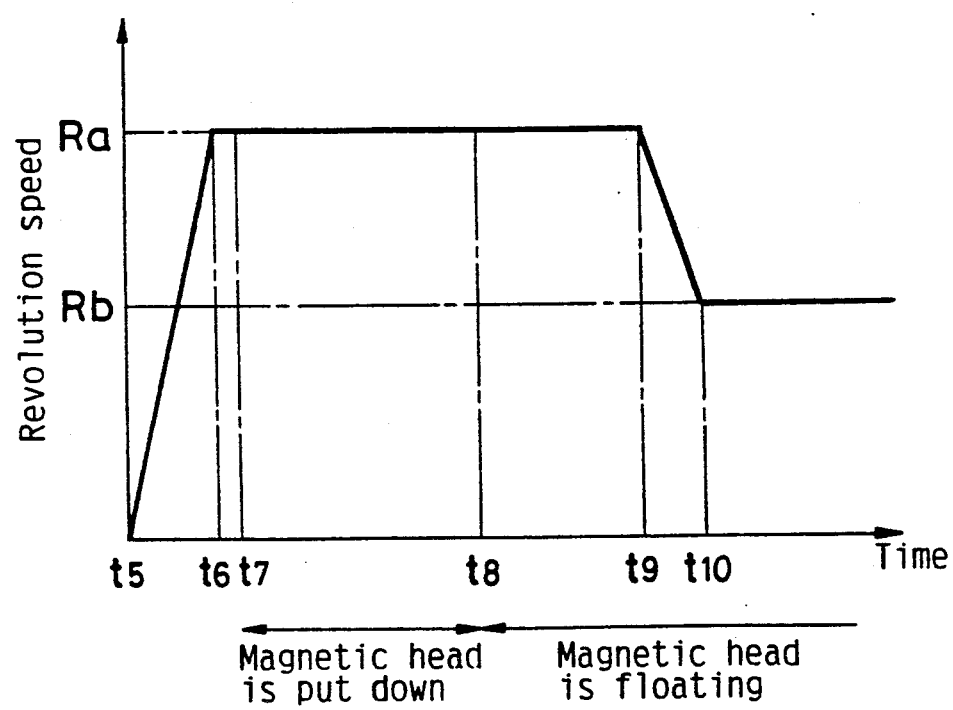
FIG. 2 is a time chart of revolution speed of the embodiment apparatus.

The operation of the above-mentioned disk writing/reading apparatus in accordance with the present invention is described hereafter with reference to a time chart of the revolution speed shown in FIG. 2.

When recording (writing), reproducing (reading) or erasing of information is started, first at the time t5 the micro computer 7 issues a control signal to the spindle motor driving circuit 8 to make the spindle motor 2 revolve at the higher revolution speed Ra. Then, the opto-magnetic disk 1 reaches the rotation speed Ra at the time t6, and the spindle motor driving circuit 8 issues a confirmation signal to the micro-computer 7, to confirm the reaching of the higher revolution speed Ra by the spindle motor 2. And thereafter, the spindle motor 2 revolves for a predetermined period, such as 3 seconds, until the time t9.

Further, a very short time after the time t6 of reaching the higher revolution speed Ra, that is at the time t7, the micro-computer 7 issues an instruction to put down the magnetic head 4 to the magnetic head raise/put-down driver 6. Therefore, the magnetic head raise/put-down driver 6 puts down the suspension member 5, hence, the magnetic head 4. At the time t8 the magnetic head 4 finishes its falling-down motion and enters the air-borne floating state. At the same the magnetic head position detector 9 detects the entering into the air-borne floating state of the magnetic head 4 and issues a detection signal to the micro-processor 7.

When the opto-magnetic disk 1 is revolving at the higher revolution number Ra, the magnetic head receives greater air-borne floating force at the putting down position on the surface of the opto-magnetic disk 1, thereby making a soft transfer to floating. Thereby, the hitherto observed possibility of damages on the surface of the opto-magnetic disk 1 and the magnetic head 4 by undesirable collision therebetween is removed. After lapsing a safety time which is between t8 and t9 for obtaining stable air-borne floating state of the magnetic head, the micro-computer 7 issues a signal to shift the revolution speed from the higher speed Ra to the predetermined rated speed Rb. Thereby the revolution speed of the opto-magnetic disk 1 lowers from Ra to Rb during the time period from t9 to t10, and the rated revolution speed Rb continues after the time t10 for the operation of recording (writing), reproducing (reading) or erasing information.

Figure 3:
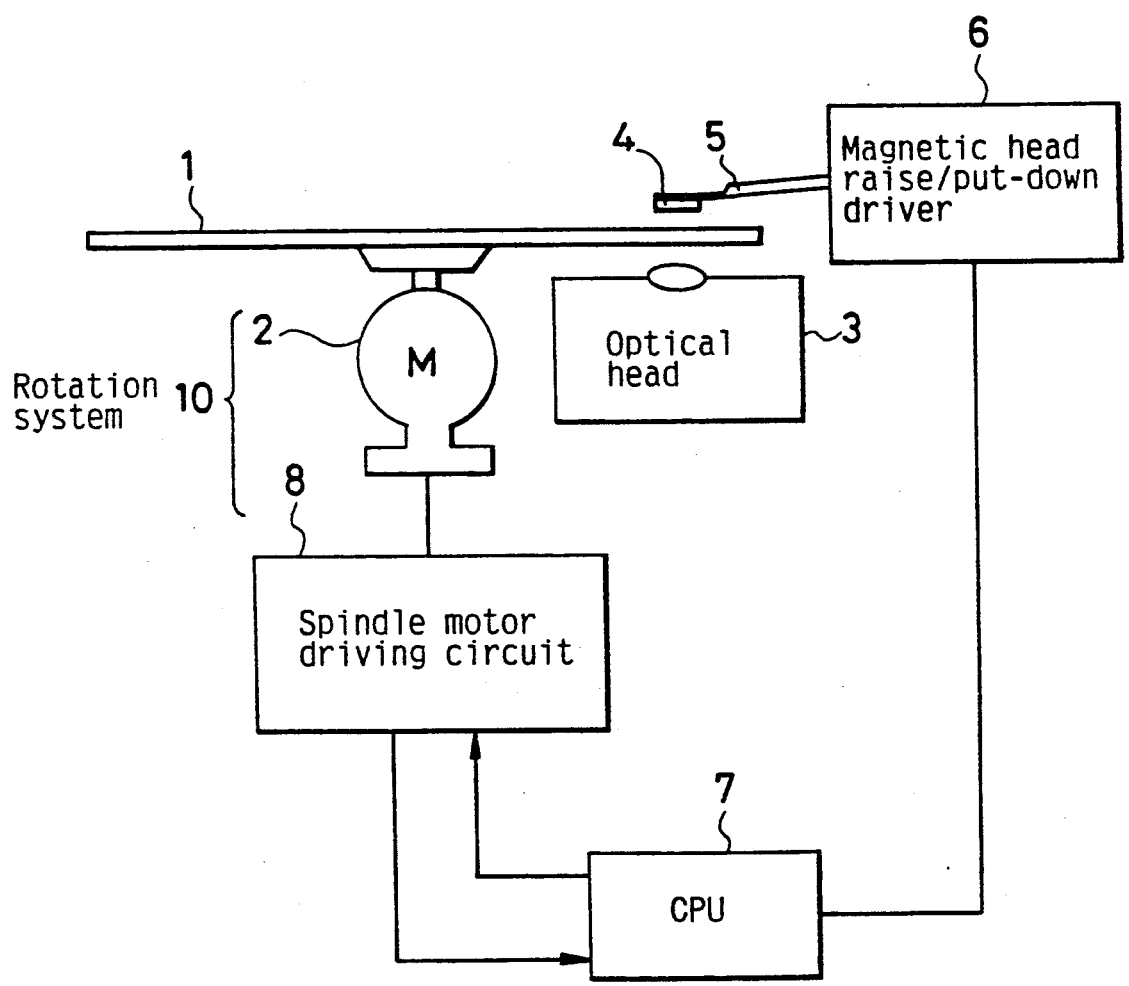
FIG. 3 is the circuit block diagram of a second embodiment of the disk writing/reading apparatus embodying the present invention.

A second embodiment in accordance with the present invention is described with reference to the circuit diagram of FIG. 3. Corresponding parts and components to the first embodiment are shown by the same numerals and marks, and the description thereon made in the first embodiment similarly apply. Differences and features of this first embodiment from the first embodiment are as follows. In this second embodiment, the magnetic head position detector 9 shown in the first embodiment of FIG. 1 is omitted, but the necessary time t7 at which the magnetic head 4 starts to be put down and the other time t9 at which the revolution speed of the spindle motor is switched to a lower speed Rb are preliminarily stored in the processor 7. And thereby, the magnetic head raise/put-down driver 6 is driven by the programmed pattern to carry out the same operation as the first embodiment. By such way, the magnetic head is put down surely after reaching of the opto-magnetic disk to the higher speed Ra, and thereafter surely after the air-borne floating of the magnetic head on the surface of the opto-magnetic disk 1, the revolution speed is switched to the lower and predetermined rated speed Rb. And thereby, the magnetic head is similarly free from the collision to the surface of the opto-magnetic disk 1 at the putting down.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Opto-magnetic writing and reading apparatus comprising:

revolving means for revolving an opto-magnetic disk, an optical head for forming at least one light spot on a track on said opto-magnetic disk for writing, reading or erasing signals on said opto-magnetic disk, a magnetic head provided opposing said optical head with said opto-magnetic disk therebetween and held by a suspension means for making said magnetic head afloat on a surface of said opto-magnetic disk with a given narrow gap therebetween by taking advantage of air-borne floating on said surface induced by revolution at a predetermined revolution speed of said opto-magnetic disk by said revolving means, said magnetic head generating magnetic fluxes at writing or erasing, raise and put-down means for raising up or putting down said suspension means with respect to said surface, control means for controlling revolution of said revolving means in a manner that firstly said opto-magnetic disk is revolved at a revolution speed higher than said predetermined rated revolution speed for a predetermined period, and thereafter said revolution speed is lowered to said predetermined revolution speed after putting down of said magnetic head to a steady-state air-borne floating position, wherein said raise and put-down means is in responsive to said control means.

2. Opto-magnetic writing and reading apparatus in accordance with claim 1, wherein said control means is a microprocessor which stores a first time period which is from the start of revolution of said revolving means to putting-down of said raise/put-down means and a second time period which is from the start of revolution of said revolving means to a time to switch said revolution speed from said higher revolution speed to said predetermined revolution speed.

3. Opto-magnetic writing and reading apparatus comprising:

revolving means for revolving an opto-magnetic disk, an optical head for forming at least one light spot on a track on said opto-magnetic disk for writing, reading or erasing signals on said opto-magnetic disk, a magnetic head provided opposing said optical head with said opto-magnetic disk therebetween and held by a suspension means for making said magnetic head afloat on a surface of said opto-magnetic disk with a given narrow gap therebetween by taking advantage of air-borne floating on said surface induced by revolution at a predetermined revolution speed of said opto-magnetic disk by said revolving means, said magnetic head generating magnetic fluxes at writing or erasing, raise and put-down means for raising up or putting down said suspension means with respect to said surface, magnetic head-position detecting means for detecting up-down motions and positions said magnetic head through position of said raise and put-down means, and control means for controlling revolution of said revolving means in a manner that firstly said opto-magnetic disk is revolved at a revolution speed higher than said predetermined revolution speed for a predetermined period, and thereafter the revolution speed is lowered to said predetermined rated revolution speed only after reception of a detection signal from said head-position detection means informing that said magnetic head is put down to a steady-state air-flow position by putting down of said raise and put-down means, wherein said control means is in responsive to said head position detecting means.

* * * * *